H. H. BOYCE.
SHOCK ABSORBER.
APPLICATION FILED SEPT. 5, 1912.
1,102,864.
Patented July 7, 1914.
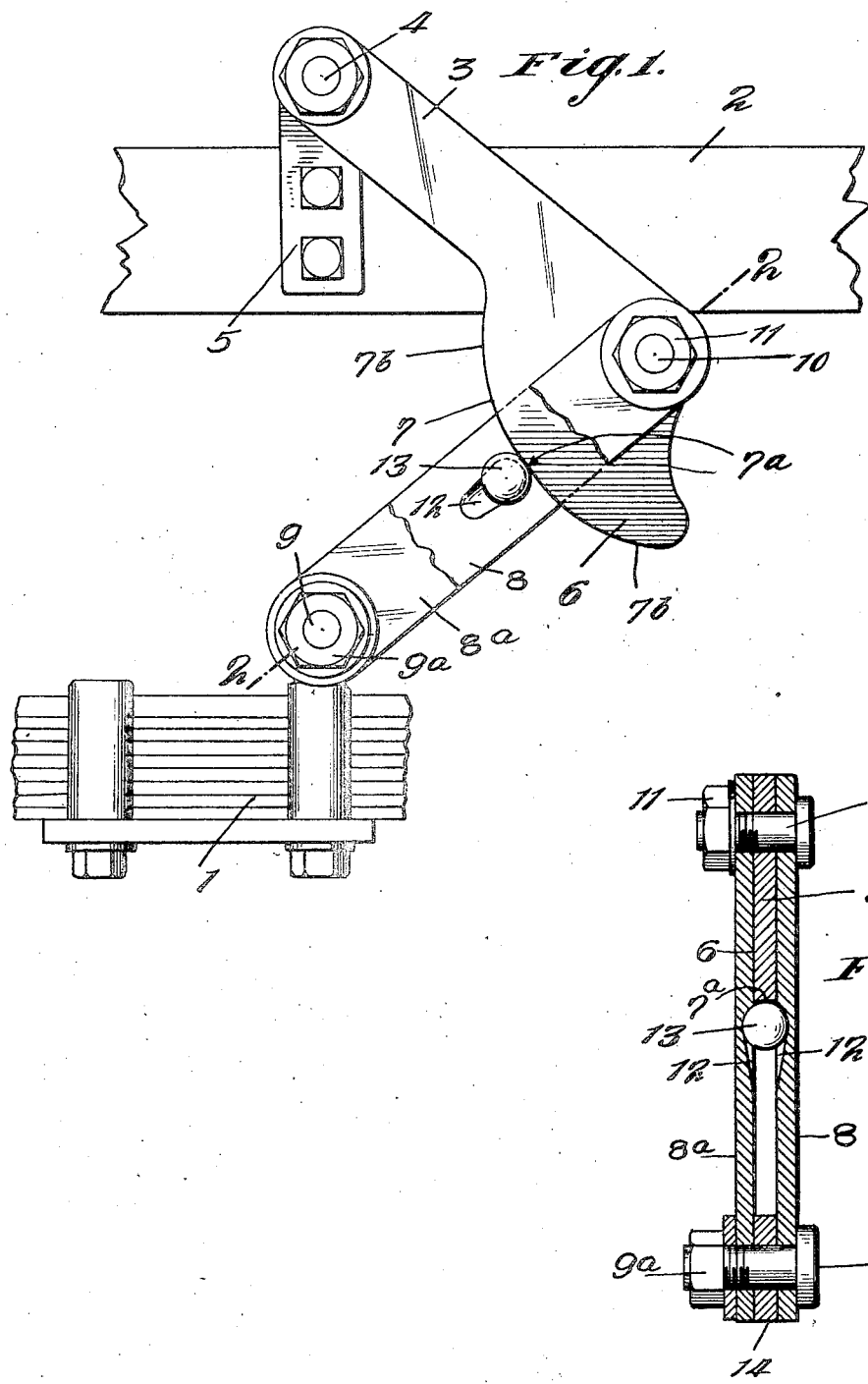
WITNESSES
INVENTOR
Harrison Hurlbert Boyce
BY
ATTORNEY

UNITED STATES PATENT OFFICE.

HARRISON HURLBERT BOYCE, OF OYSTER BAY, NEW YORK, ASSIGNOR TO EDWARD V. HARTFORD, OF DEAL, NEW JERSEY.

SHOCK-ABSORBER.

1,102,864.  Specification of Letters Patent.  Patented July 7, 1914.

Application filed September 5, 1912. Serial No. 718,663.

*To all whom it may concern:*

Be it known that I, HARRISON HURLBERT BOYCE, a citizen of the United States, residing at Oyster Bay, in the county of Nassau and State of New York, have invented certain new and useful Improvements in Shock-Absorbers, of which the following, taken in connection with the accompanying sheet of drawings, forms a full, clear, and concise description.

My invention pertains to shock absorbing devices used for the purpose of modifying or controlling the action of vehicle springs and absorbing or preventing the shocks due to the abrupt action of the same when the vehicle to which they are attached is passing over inequalities in the road-bed.

The object of my invention is to produce a device of this character which will be simple in construction, economical to manufacture, and efficient in its operation. This, as well as other objects, will manifest themselves upon a reading of the following specification.

Referring to the accompanying sheet of drawings in which I have illustrated one preferable embodiment of my invention, I will proceed to describe the same, having it understood that I am not limited to the specific details of construction shown and described, as it is manifest that these may be modified and changed without departing from the spirit or scope of the invention.

Figure 1 illustrates, in side elevation, a preferable form of shock absorber, showing its operative relation with the chassis and suspension spring, fragmentary details of which are illustrated; and Fig. 2 is a sectional view taken on line 2—2 of Fig. 1.

In detail the numeral 1 indicates the vehicle spring attached to the running gear, which is of usual and well known construction.

2 indicates a portion of the chassis, to both of which are attached portions of the shock-absorbing device. The shock absorber comprises an arm 3, attached and mounted to the chassis so as to oscillate by means of its connection at 4 to a support arm 5, the latter being rigidly fastened to the chassis. The arm 3 is provided with a cam-shaped end 6, which has an engaging edge 7, of graduated contour; that is, an edge formed with a gradually-increasing curve in two directions with respect to the fulcrum point or center of the cam shaped end. The cam surface has a low normal point at $7^a$ and high or peak points at $7^b$. To the spring of the running gear are attached arms 8 and $8^a$, by means of a suitable bolt or clamp 9 and nut $9^a$, which form a bifurcated construction as shown. These arms are arranged to straddle the cam carrying arm 3, and are attached to the latter by means of a bolt 10 and nut 11. At a point approximately midway of the ends of the arms 8 and $8^a$, depressions or cut-out portions 12 are provided, which gradually increase in depth from the surface inwardly and are of such form as to accommodate and provide a seat for a ball 13. A filler or separating disk 14, approximately the width of the cam 6 of the arm 3, is disposed between the arms 8 and $8^a$ so as to separate and maintain them in alinement with respect to the end which is secured to the cam carrying arm at 10. The arms 8 and $8^a$ have a certain amount of resilience or flexibility which is necessary to effect the required variable amount of drag between the cam face 7 and the ball 13 when the latter is moved or forced from its seat upon the operation of the device.

Upon the operation of the device it will be apparent that the normal action of the suspension spring will be retarded to a greater or less extent when passing over inequalities in the road-bed. This retardative effect is produced by the cam face 7 coöperating with the ball 13, causing the latter to be forced downwardly and outwardly against the inclined surface of the depressions 12, distorting and tending to separate and force outwardly the arms 8 and $8^a$, this action increasing in proportion and being commensurate with the amount of jar or abrupt action of the suspension spring. The drag, of course, naturally increases as either peak of the cam face is approached. The natural tendency of the spring arms 8 and $8^a$, owing to the inclination of the surfaces of the depressions, is to force back or return the ball 13 to its seat in the deepest portion of the depression. When the ball is in its normal position the arms 8 and 8ᵃ are perfectly straight and parallel with one another, as shown in Fig. 2.

It will be apparent from the construction illustrated that both the depressive action as well as the rebound action of the vehicle parts operates the device to effect absorption of the shocks due thereto.

In the illustrated embodiment of my invention I have produced a shock absorber in which a minimum amount of friction obtains, thus reducing the wear due to friction and consequently prolonging the life of the parts of which it is composed, the structure being so designed as to have the tendency of retracting or forcing the parts to their normal initial position, but at the same time affording a certainty of increasing drag between the parts and a consequent retardative effect to the action of the suspension spring when operated.

Having thus described my invention, what I claim as new herein and desire to secure by Letters Patent is:

1. A shock absorber for vehicles provided with spring suspension means, comprising a cam-shaped member adapted to be attached to the vehicle body, a member of bifurcated construction adapted to be attached to the running gear, a spherical bearing part mounted and retained between and by the bifurcated bearing part, said member being adapted to coöperate with the cam-shaped member and the bifurcated member to produce a variable drag between the parts upon the operation of the same.

2. In a shock absorber for vehicles having spring suspension means, the combination of a cam-shaped member adapted to be attached to the vehicle body, a member attached to the said cam-shaped member and adapted to be attached to the running gear, a spherical resistant member carried by said latter member, said spherical resistant member coöperating with the cam-shaped member to produce a drag to modify the normal action of the spring suspension means.

3. A shock absorber for vehicles having spring suspension means, comprising an arm adapted to be attached to the body of the vehicle, said arm being provided with a cam shaped extremity, a flexible member of bifurcated construction straddling and attached to said arm, said bifurcated member being adapted to be attached to the running gear of the vehicle, a cam engaging member interposed and held between and partly within the parts forming the bifurcated member, said cam engaging member being adapted to flex the parts of the bifurcated member when operated by the cam, and producing a variable drag between the parts to modify the normal action of the spring suspension means.

4. A shock absorber for vehicles having spring suspension means, comprising a member adapted to be attached to the body of the vehicle, a member adapted to be attached to the running gear of the vehicle, both members being attached together by means of a common pivot connection, and both members being adapted to oscillate, one of said members having a cam like formation and the other member being provided with a yieldably mounted spherical cam engaging member coöperatively associated with the members and adapted to produce an increasing drag as the parts are moved from the normal to modify the action of the spring suspension means.

5. In a shock absorber for vehicles having spring suspension means, the combination of an arm provided with a cam shaped extremity, said arm being adapted to be attached to the body of the vehicle, a pair of flexible arms adapted to be attached to the running gear of the vehicle, a common pivot connection for all of the arms, a ball seated and held between the flexible arms, said cam shaped extremity of said first arm being also positioned between the flexible arms and contacting with said ball and adapted to move said ball in opposition to the tension of the flexible arms to produce a drag between the ports.

6. In a shock absorber for vehicles, having spring suspension means, in combination an arm of bifurcated construction adapted to be attached to one movable part of the vehicle, said arm being provided with pockets provided with inclined surfaces, a spherical resistant member mounted in said pockets and adapted to be forced along said inclined surfaces, another arm adapted to be attached to a relatively different movable part of the vehicle, interposed between the bifurcated arm and provided with a cam surface adapted to engage the spherical resistant member, said cam surface being effective to move the spherical resistant member along the inclined surfaces of the bifurcated arm by either a depressive or rising movement of the arm.

7. In a shock absorber for vehicles, having spring suspension means, in combination an arm of bifurcated construction adapted to be attached to one movable part of the vehicle, said arm being provided with pockets with inclined surfaces, a spherical resistant member mounted in said pockets and adapted to be forced along said inclined surfaces, another arm adapted to be attached to a relatively different movable part of a vehicle interposed between the bifurcated arm and provided with a cam surface adapted to engage the spherical resistant member, said cam surface being effective to move the spherical resistant member along the inclined surfaces of the bifurcated arm by either a depressive or rising movement of the arm, said bifurcated arm bearing with spring tension against the spherical resistant member and tending to force the latter down the inclined surfaces of said arm into the deepest portions of said depressions.

In witness whereof I have hereunto set my hand in the presence of two subscribing witnesses.

HARRISON HURLBERT BOYCE.

Witnesses:
   WM. E. DUNN,
   CHAS. LYON RUSSELL.